T. N. EGERY.
Machines for Sawing Laths.

No. 155,075. Patented Sept. 15, 1874.

Witness
Lutta A. Seavey
W. E. Brown

Inventor
Thomas N. Egery
Per Wm Franklin Seavey Atty.

UNITED STATES PATENT OFFICE.

THOMAS N. EGERY, OF BANGOR, MAINE.

IMPROVEMENT IN MACHINES FOR SAWING LATHS.

Specification forming part of Letters Patent No. 155,075, dated September 15, 1874; application filed March 5, 1874.

*To all whom it may concern:*

Be it known that I, THOMAS N. EGERY, of Bangor, in the county of Penobscot and State of Maine, have invented certain new and useful Improvements in Machines for Sawing Laths; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 3:
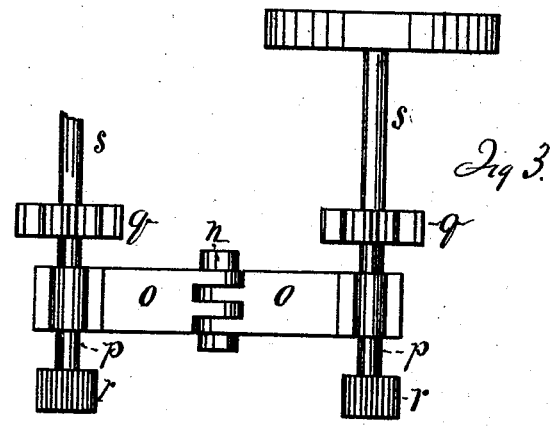
Figure 2:
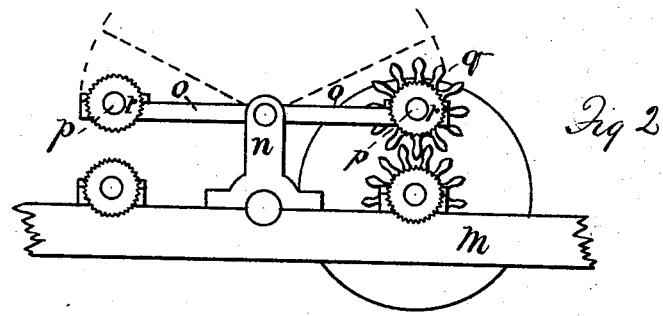
Figure 1:
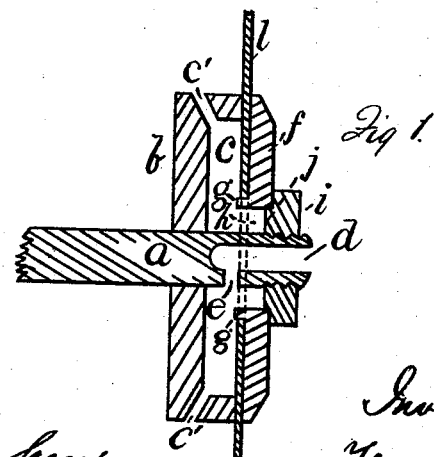

Figure 1 shows a section of the saw-collar. Fig. 2 shows an elevation of the feed-rolls, &c. Fig. 3 shows a plan of same.

Same letters show like parts.

The object of my invention is to improve upon the lath and circular saw mills now in use. My improvement is designed to keep the saws cool, and to prevent their being sprung by the expansion of the arbor. I effect my purpose by employing a collar provided with an annular chamber, from which openings extend to its periphery. The arbor of the saw is also hollowed, communicating with the air at its outer end, and with the chamber in the collar. The swift revolution of the collar establishes a continual current of air passing through the hollow arbor, and out of the holes in the circumference of the collar. In addition to this annular chamber the saw is so attached to the arbor that neither it nor the outer or removable collar comes in contact with it. This construction, hereafter described, prevents the expansion of the arbor when heated from springing or warping the saw, as would be the case if the saw fitted tightly, and also leaves an annular space between the saw and arbor, into which the cool air from the hollow arbor may pass.

Referring to the drawings, Figure 1 at $a$ shows the saw-arbor, having thereon the collar $b$, provided with the annular chamber $c$ and outlets $c'$. $d$ shows the hollow in the arbor, communicating at its outer end with the air, and at $e$ with the chamber $c$. The operation has been already explained. The method of attaching the saw is also shown in this figure. The opening in its center is considerably larger than the arbor, and the outer or removable collar $f$ is provided with a flange, $g$, upon which the saw $l$ rests. The opening in the collar $f$ is also larger than the arbor, leaving an annular space, $h$, between them. The nut $i$, by which the saw and collar $f$ are held onto the arbor, is provided with a flange $j$, which fits the opening in the collar $f$.

It will be seen upon examination that neither the saw $l$ nor collar $f$ touches the arbor at any point, both being sustained, as well as retained, on the arbor by the nut $i$ and its flange $j$. This leaves an annular space, $h$, before mentioned, which not only keeps the saw from being sprung by the expansion of the arbor, but also aids materially in keeping it cool.

I do not claim the devices shown in the patent issued to C. R. Tompkins July 16, 1872, No. 129,193; but

What I claim as my invention, and desire to secure by Letters Patent, is—

In combination with a hollow saw-arbor, $a$, saw-collar $b$, provided with a chamber, $c$, and outlets $c'$, the nut $i$, having a flange, $j$, thereon, and the removable collar $f$, provided with the flange $g$, fitting the opening in the saw, whereby an annular space, $h$, is left around the arbor, as shown and described.

In testimony that I claim the foregoing, I have hereunto set my hand this 28th day of February, 1874.

THOS. N. EGERY.

Witnesses:
 WM. FRANKLIN SEAVEY,
 SIMON H. RICHARDSON.